United States

Nakamura et al.

[11] 3,919,883
[45] Nov. 18, 1975

[54] METHOD AND APPARATUS FOR DETECTING PROGRESSIVE CRACKS IN MATERIALS

[75] Inventors: Yosio Nakamura, El Lago; Charley L. Veach, Alvord, both of Tex.

[73] Assignee: General Dynamics Corporation, Fort Worth, Tex.

[22] Filed: Mar. 5, 1974

[21] Appl. No.: 448,115

[52] U.S. Cl. .............................................. 73/71.4
[51] Int. Cl.$^2$ ........................................ G01H 1/00
[58] Field of Search.............. 73/67, 71.4, 88 R, 100

[56] References Cited
UNITED STATES PATENTS

| | | | |
|---|---|---|---|
| 3,713,127 | 1/1973 | Keledy et al. | 73/67 |
| 3,782,183 | 1/1974 | O'Connor et al. | 73/67 |

OTHER PUBLICATIONS

Dunegan, H. L., Acoustic Emission, Research/Development, May 1971, pp. 20-24, 73-67.

*Primary Examiner*—Richard C. Queisser
*Assistant Examiner*—John P. Beauchamp
*Attorney, Agent, or Firm*—John R. Duncan; Charles E. Schurman

[57] ABSTRACT

An acoustic emission monitoring technique for detecting the growth or formation of cracks or other flaws in structures is disclosed. A growing crack emits acoustic signals which can be detected by an appropriate sensor on the structure surface. It has been found that the rate of amplitude buildup decreases as distance from a sensor to the site of the acoustic event increases. Thus it is possible by selecting only acoustic signals which have at least a selected build-up rate, to eliminate most background noise and other signals originating further than selected distance from the sensor. Thus, the formation and growth of cracks in the selected area can be accurately monitored in an acoustically noisy environment.

11 Claims, 8 Drawing Figures

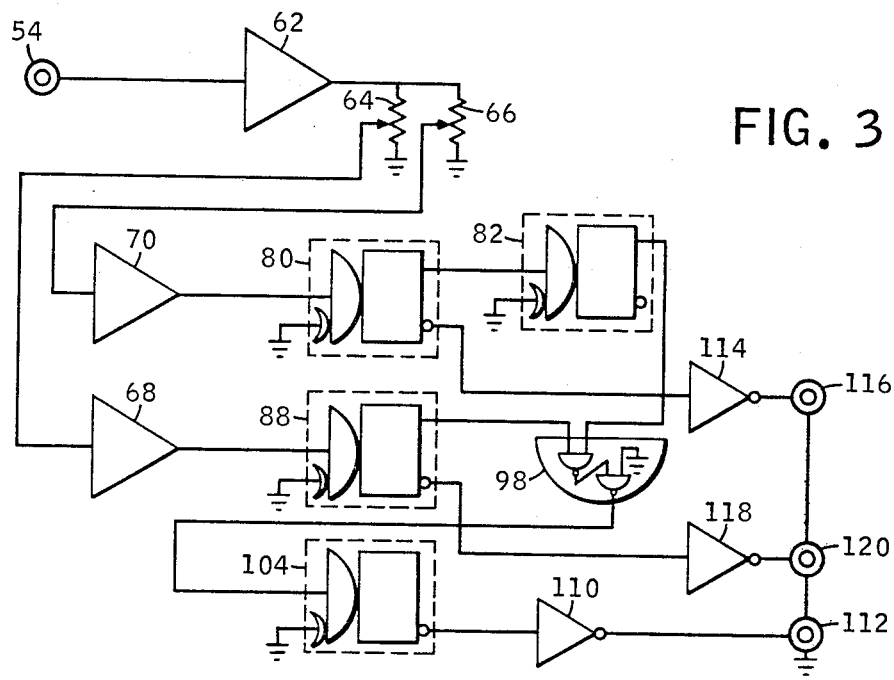
FIG. 3
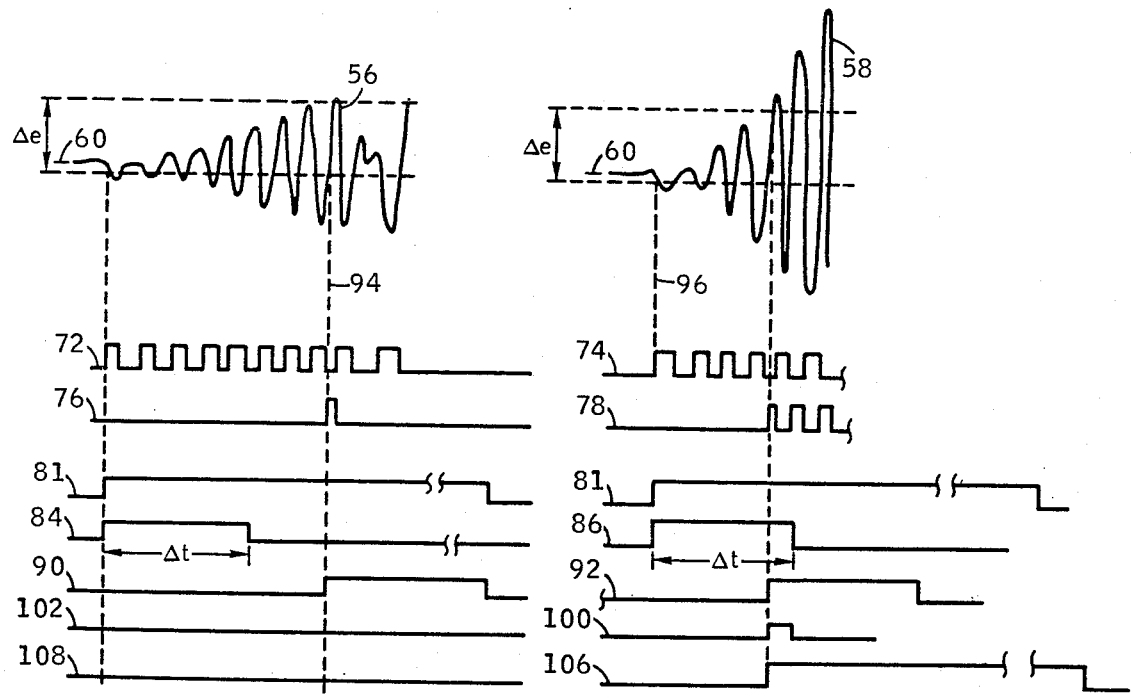
FIG. 4a
FIG. 4b

METHOD AND APPARATUS FOR DETECTING PROGRESSIVE CRACKS IN MATERIALS

BACKGROUND OF THE INVENTION

This invention relates in general to non-destructive testing and, more specifically, to the detection of cracks and other flaws by acoustic emission monitoring.

Solid materials deform in response to applied stress. The work done by an applied force is stored in the material so long as the deformation is within the elastic limit of the material. When the local stress in a structure exceeds the strength of the material at that point, the materials break or a crack is formed. The formation or growth of the crack relieves the local strain, releasing part of the energy stored at that location. Part of the released energy is expended as surface energy by the increased crack area, while the balance is transmitted from the region as acoustic pressure (or elastic) waves. This emission of energy in the form of acoustic waves is called acoustic emission.

Sensors at the structure surface can detect acoustic waves in the material and emit a corresponding electrical signal. With appropriate signal amplification, discrimination and triangulation, the location of the crack can be determined. Recently, attempts have been made to develop this technique for use in the non-destructive testing of materials to detect nucleation or propagation of cracks or other internal structural flaws.

Generally, interference from background noise has limited this technique to nearly noise-free cases, such as the inspection of weld joints, pressure vessels, etc. While frequency filtering can sometimes exclude much back-ground noise, noise in the frequency range to be analyzed, coming from outside the area being examined often prevents accurate defect detection. Inspection of large, complex structures during structural tests have been very difficult due to noise resulting from vibration in the loading apparatus, relative movement in joints and connections in the loading apparatus, in addition to noise generated in the test structure. Prior techniques have been incapable of excluding this background noise, much of which originates outside the test structure.

Recently there has been developed method and apparatus for acoustic emission testing which uses a plurality of master and slave sensors to isolate a region being examined. This system is described in detail in copending U.S. Pat. application Ser. No. 400,766 filed Sept. 26, 1973, now Pat No. 3,858,439 assigned to the assignee of this application. While this system is highly effective in excluding background noise from the region being tested, it is disadvantageous in requiring a number of sensors surrounding the test region. Some areas on some structures are inaccessible to the sensor array. Setting up the array is time consuming, and the array is fixed once set up.

Thus, there is a continuing need for improved acoustic emmission monitoring methods and apparatus to permit the rapid and convenient examination of complex structures.

SUMMARY OF THE INVENTION

It is, therefore, an object of this invention to provide an effective technique for detecting the formation and growth of cracks in a structure using acoustic emission.

Another object of this invention is to provide an acoustic emission monitoring system capable of excluding acoustic signals originating away from a selected region.

Still another object of this invention is to provide an acoustic emission monitoring system suitable for use with complex structures under load.

The above objects, and others are accomplished in accordance with this invention by a technique which utilizes the difference in rate of amplitude buildup for signals originating at different distances from a sensor to exclude noise originating outside of the region near the sensor. The extraction of distance information in acoustic signals is accomplished by electronically examining the rate of buildup of the observed signal amplitude. When an impulsive release of acoustic energy occurs in a structrure of finite thickness, a train of waves rather than an impulsive wave is generally observed at a finite distance from the source. The arrival time and the observed amplitude of each frequency component of the wave train are determined by the mode of wave propagation in the medium, the source function for that mode, the group velocity and its derivative with respect to frequency, the distance from the source to the sensor, and the overall response of the sensing devices. The cumulative result is that the rate of buildup of the observed signal amplitude becomes a direct function of distance. By electronically excluding signals originating at a greater than selected distance, acoustic emission originating at progressive cracks within a selected region near the sensor can be accurately monitored.

BRIEF DESCRIPTION OF THE DRAWING

Details of the invention, and of a preferred embodiment thereof, will be further understood upon reference to the drawing, wherein:

FIG. 3 is a schematic circuit diagram of an acoustic emission monitor;

FIG. 4 is a diagram illustrating signal waveforms at various points in the monitor of FIG. 3, FIG. 4a representing a distant signal source and FIG. 4b representing a nearby signal source;

DETAILED DESCRIPTION OF THE INVENTION

Figure 1:
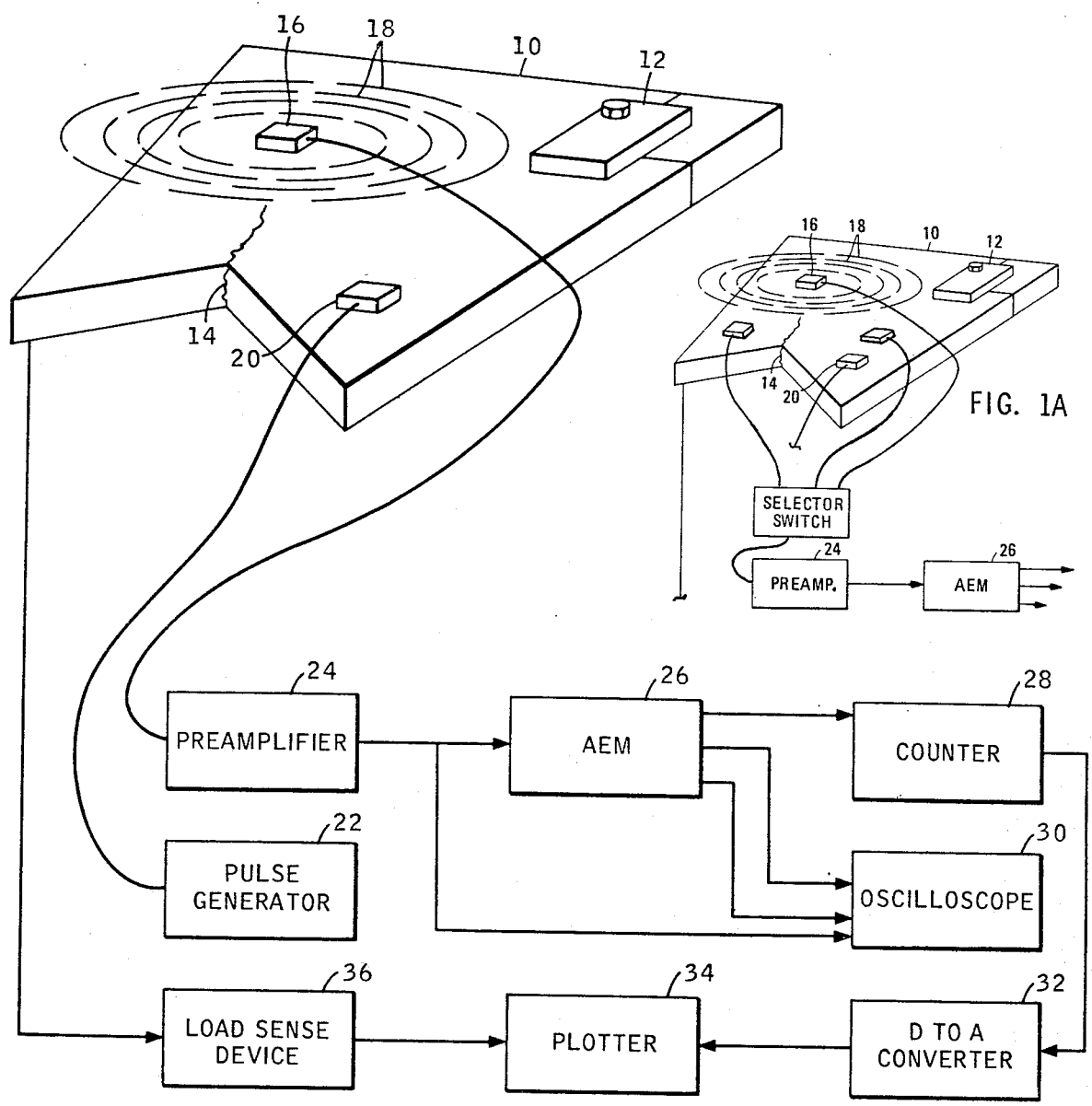
FIG. 1 is a simplified schematic representation of the sensor installation and monitoring devices.

Referring now to FIG. 1, there is seen a schematic representation of a structure 10 being tested and an array of monitoring components. The structure 10 is placed under load by conventional fixtures which are not shown in detail, for clarity, but are represented by loading means 12. Loading means 12 may, typically, be a bolted attachment to a load applying means at which acoustic noise will originate when the structure is loaded. Under load, a crack 14 is formed or grows.

A sensor 16 is placed on the surface of structure 10. As is detailed below, the spatial sensitivity of sensor 16 may be adjusted to detect acoustic emissions occurring within a selected region around the sensor, as schematically illustrated by connection rings 18. Any suitable transducer may be used for sensor 16. Typical sensors include lead-zirconate-titanate transducers such as the Glennite HST-41 available from Gulton Industries. Preferably, a number of sensors are placed on the structure with each sensor selectively connectable to the monitoring system through a conventional selector switch. A single sensor 16 is shown in FIG. 1 for clarity.

In order to calibrate the system, a transducer 20, similar to sensor 16, may be placed at various positions on the surface of the structure. Transducer 20 is connected to a conventional pulse generator 22. A pulse will cause an acoustic wave to be generated at transducer 20 similar to that produced by a progressive crack. By moving transducer 20 toward and away from sensor 16, the limits of the covered region may be determined and the system calibrated.

Signals from sensor 16 are passed to a pre-amplifier 24 which amplifies the signals and passes them through appropriate frequency filters to remove low frequency noise. Any suitable pre-amplifier may be used, such as the Arvee S-30, available from Arvee Engineering Co.

Figure 5:
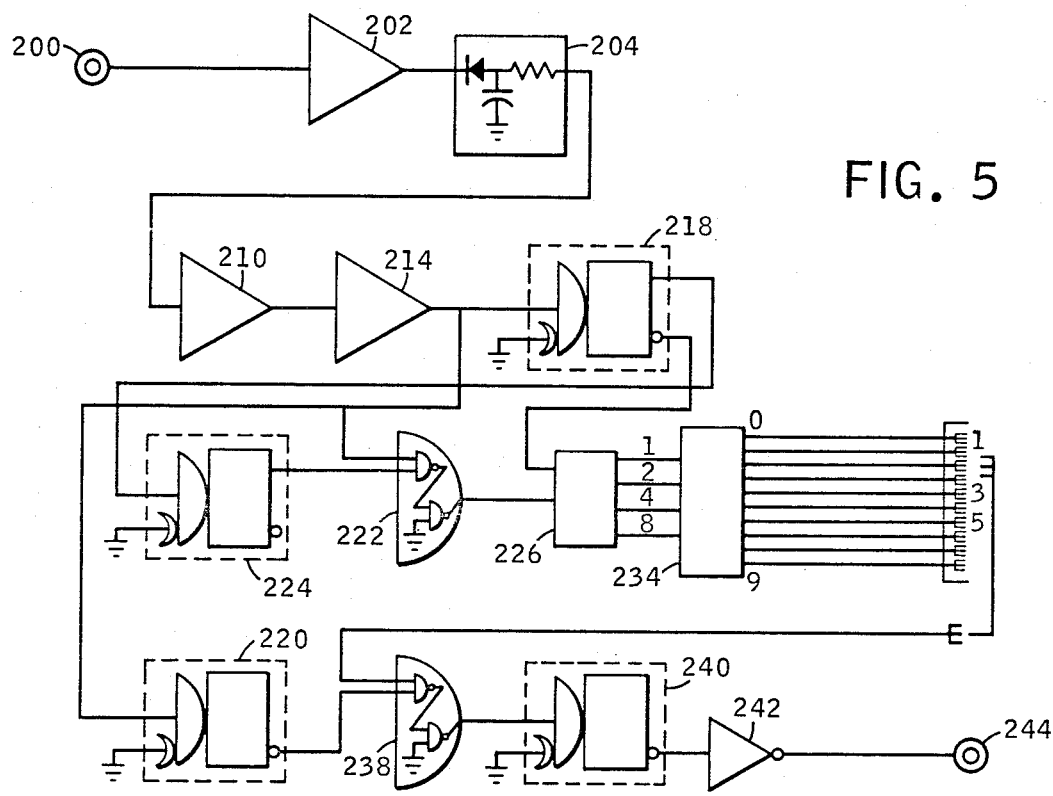
FIG. 5 is a schematic circuit diagram of an alternative embodiment of an acoustic emission monitor.

The signals then pass to Acoustic Emission Monitor (AEM) 26. Details of two preferred embodiments of AEM 26 are illustrated in FIGS. 3 and 5. Signals entering AEM 26 include those resulting from events, such as growth of crack 14 occurring near sensor 16, and noise from outside sources, such as loading fixture 12. As is detailed below, AEM 26 electronically processes these signals and produces output signals corresponding only to incoming signals which meet selected signal amplitude rise-time criteria showing that they originated within the selected region.

Signals from AEM 26 may be recorded or observed in any suitable manner. Typically they may be accumulated by an event counter 28, such as a Model 1492 Scaler available from Canberra Industries, or, the output signals may be observed on oscilloscope 30. If desired, the cumulative count from the counter 29 can be converted to an analog voltage in a conventional digital-to-analog converter 32 and displayed on one axis of a conventional X–Y plotter 34. The other axis of plotter 34 may be controlled by a conventional load indicating device 36. Thus, the growth of crack 14 in response to varying the load on the structure can be conveniently analyzed.

While a single sensor 16 is shown in FIG. 1, if desired a plurality of sensors may be placed on structure 10 and may be selectively connected to the monitoring system through a conventional selector switch.

A single system is capable of monitoring acoustic events within a selected area, but does not locate the source within that area. To precisely locate the acoustic emission source, it is preferred that three of the above-described systems be used with three sensors. The area of sensitivity of each can be adjusted until the source is just within the detection area, thus establishing a circle about each sensor along which the source is situated. The source, then, must be at the point where all three circles intersect.

Figure 2:
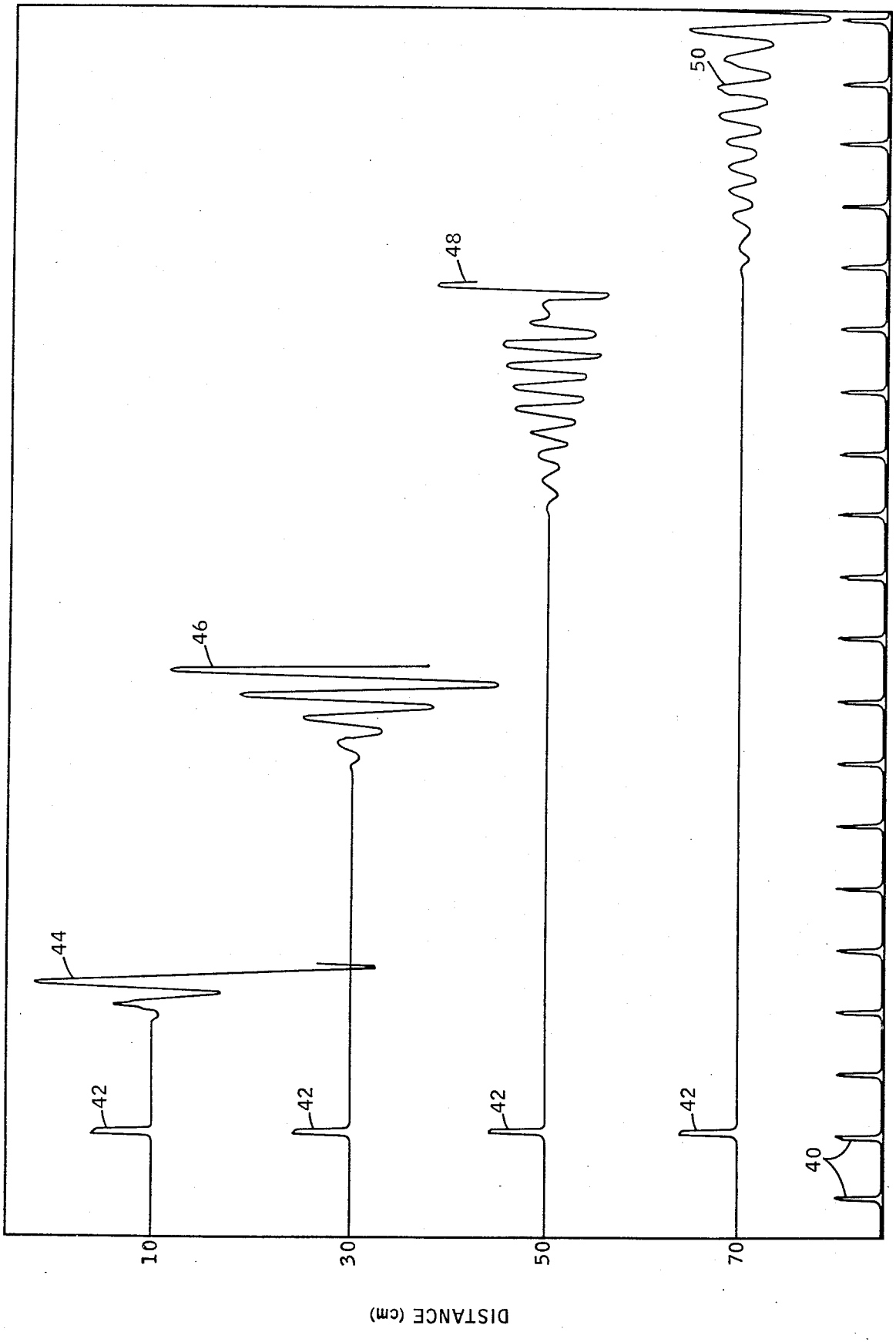
FIG. 2 is a diagram comparing waveforms representing acoustic events occurring a different distances from a sensor.

The acoustic phenomenon which is utilized by the system of this invention is illustrated in FIG. 2. FIG. 2 shows plots of acoustic signal shapes at different distances from the source of an acoustic pulse. Signal amplitude is plotted against time. Each mark 40 indicates a time interval of 10 microseconds. Initial marks 42 indicate the time of the acoustic pulse. At 10 centimeters between the sensor and the acoustic source, wave 44 rapidly rises to a maximum amplitude. At 30 centimeters, the rise time of wave 46 is longer, as seen, and progressively longer at 50 centimeters (wave 48) and 70 centimeters (wave 50). Thus, it has been found that by measuring the time required for the signal wave to reach a selected amplitude, the distance of the source from the sensor can be determined. Since acoustic waves travel at different rates in different materials, and are affected by other variables, the system should be calibrated using a pulse generator 22 and transducer 20 to produce a distance/rise time pattern for a given structure.

A first preferred embodiment of AEM 26 is shown in FIG. 3. Signals at various points through the circuit schematically illustrated in FIG. 3 are illustrated in FIG. 4.

As seen in the embodiment of FIG. 3, signals from pre-amplifier 24 enter through terminal 54. At this point, the signal waveform from a distant acoustic event has the shape shown at wave 56 (FIG. 4a), while wave 58 (FIG. 4b) shows the waveform resulting from an acoustic event near the sensor. A zero reading at level 60 indicates no signal. The selected amplitude to be measured, indicated as "$\Delta e$" ranges from a slight negative level, e.g., −5mv to a higher positive level, e.g., +50mv. The time measured then is the rise-time between when the signal reaches −5mv and when it reaches +50mv. Using levels of both signs, rather than +5mv and +50mv helps eliminate some non-sineusoidal background noise.

Upon entering the AEM, the signals from terminal 54 pass to input summing amplifier 62 which serves to amplify the electrical signals. Typically, amplifier 62 comprises $\mu$A702 operational amplifiers from Fairchild Semiconductor Co.

The output of amplifier 62 passes to two potentiometers 64 and 66, which are adjustable to set the signal discriminator levels. Typically, the potentiometers are set for a 10-to-1 ratio between potentiometers 64 and 66.

From potentiometers 64 and 66, the signals pass to discriminators 68 and 70, respectively each of which comprises a differential comparator such as a Fairchild Semiconductor's $\mu$A710, which act as level detectors. If primary discriminator 70 is set, for example, at −5mv, the output will include a pulse for each time wave 56 or 58 exceeds a negative 5mv level. Thus, waveform 72 results from wave 56 and waveform 74 results from wave 58. Similarly, where secondary discriminator 68 is set for a higher level of the opposite sign, such as positive 50mv, the resulting waveforms 76 and 78 will show a pulse for each time waves 56 and 58 exceed that level. As can already be seen from FIG. 4, the time duration between the first pulse of wave 72 and the first pulse of wave 76 is much greater than between the corresponding first pulses or waves 74 and 78, showing that the rise time of original signal wave 56 is greater than for wave 58, so we know that the acoustic event causing wave 58 must have been nearer to the sensor. The remainder of the circuit serves to select and produce an output signal for only such nearby occurring signals.

Output signals from primary discriminator 70 are applied to the lockout gate generator 80 generating a gate of duration that is slightly longer than that of the original signal 56 or 58 (typically about 150 $\mu$s), as illustrated as wave 81. Typically, lockout gate generator 80 is a retriggerable monostable multivibrator such as a TTµL 9601 from Fairchild Semiconductor. The leading edge of lockout gate 81 triggers the primary gate generator 82 during the first cycle of the input signal and prevents the primary gate generator 82 from being triggered by succeeding oscillations of the signal. Primary gate generator 82 may also be a TTµL 9601 monostable multivibrator. The output form of primary gate generator 82 is shown at 84 and 86 for the two waves 56 and 58, respectively, with "$\Delta t$" that is to be selected (typically about 10 µs).

The time constant of the lockout gate generator 80 is normally adjusted to be slightly longer than the normal ringdown time of the acoustic signal so that only one primary gate is generated for each acoustic event. The primary gate time (waves 84, 86) is selected to be equal to the rise time of acoustic signals originating at the maximum desired distance of detection.

Meanwhile, the signal from secondary discriminator 68 is used to trigger secondary gate generator 88, which also may be a monostable multivibrator such as TTµL 9601 which produces an output (typically 10µs long) shown at 90 and 92 for waves 56 and 58, respectively. The secondary gate generator is triggered by the initial pulse from secondary discriminator 68, as indicated by broken lines 94 and 96.

The primary and secondary gate signals from generators 82 and 88 are applied to the inputs of a logic "AND" gate 98, which typically may be Motorola MC846P quad dual input NAND gates. If the primary and secondary gate signals are coincident, as in FIG. 4b (waves 86 and 92), an output pulse, as shown in wave 100, is generated by gate 98. If the primary and secondary gate signals are not coincident, as in FIG. 4a (waves 84 and 90), then no output signal is produced by gate 98, as shown by line 102.

The output of gate 98 passes to a count gate 104, which typically may be a monostable multivibrator such as a TTµL 9601. A pulse, typically 10ms long, as shown at 106 in FIG. 4b, is generated in response to the output pulse shown at 100. Where there is no pulse, as in line 102, FIG. 4a, then no output pulse will be generated in count gate generator 104, as indicated by line 108.

Signals from count gate generator 104 pass to a line driver 110, which may comprise a quad dual input NAND SN 7401N, available from Texas Instruments, coupled with an output transistor such as an MPS2369 from Motorola Semiconductor Products. The resulting signal at terminal 112 is suitable for processing by a conventional counter or oscilloscope, as described above.

Also available as outputs for counting and analysis are the lockout gate signal from gate 80 through line driver 114 at terminal 116 and the secondary gate signal through line driver 118 at terminal 120. The primary uses of these outputs are for adjusting the respective gate durations for optimum operation as described above. However, they may also be counted for noise analysis.

Thus, the AEM schematically illustrated in FIG. 3 is capable of excluding all acoustic signals originating at a greater than selected distance from the sensor. As one skilled in art will realize, other electronic components than those mentioned above may be used to perform the various functions, and that various potentiometers, resistors, etc., may be included to provide for adjustments in sensitivity, etc.

Figure 6:
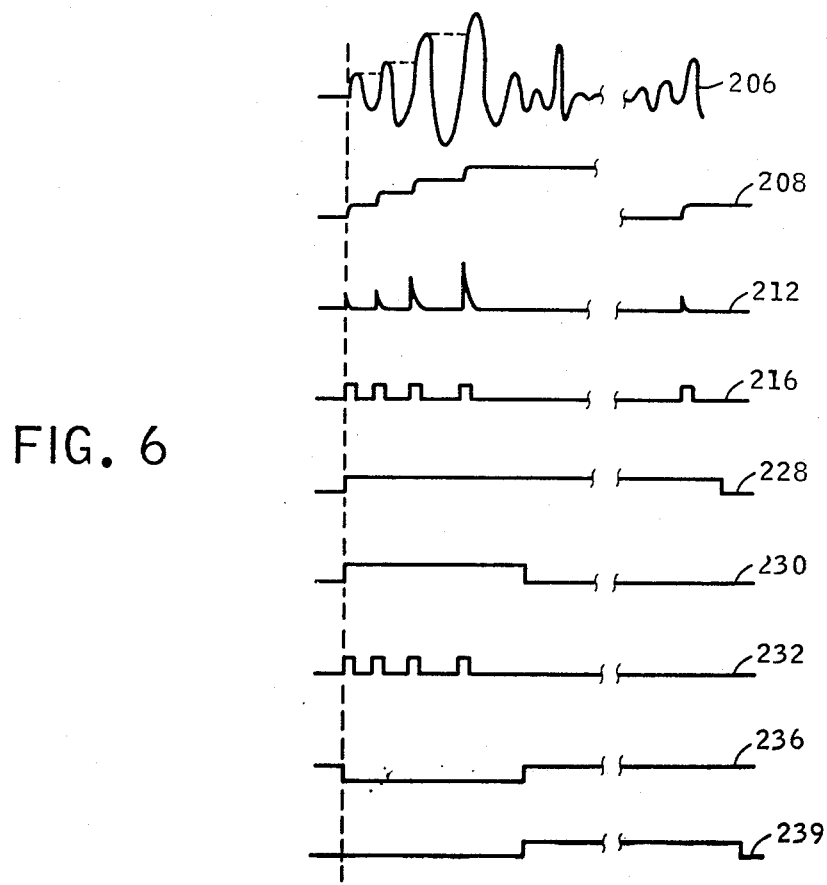
FIG. 6 is a diagram illustrating signal waveforms at various points in the circuit shown in FIG. 5.

Referring now to FIGS. 5 and 6, there is seen a schematic circuit diagram for an alternative embodiment of the AEM and of waveforms at various points in the circuit. In this embodiment, the input signal from the sensor via the preamplifier enters the AEM at terminal 200 and passes to a mixer-amplifier 202 which amplifies the signal and filters out low frequency noise as does mixer-amplifier 62, described above. The signal, which has the waveform shown at 206, then passes to a conventional integrator circuit 204 comprising a diode, resistor and capacitor as shown.

The output of integrator 204 has the appearance shown at 208. The amplitude of the integrator output steps up each time the wave height exceeds the previous height within a set time. The charging time constant is short compared with one-half cycle of the signal, while the discharge time constant is preferably made more than ten times the period of the input signal.

The signal is next fed to a differentiator which produces a single trigger output for each positive half cycle of the original wave form 206 which is higher than the preceding positive half cycle. A typical such differentiator utilizes the µA710 operational amplifier available from Fairchild Semiconductor. The waveform of the output of differentiator 210 is shown at 212. These trigger-like spikes are applied to a voltage level discriminator 214, typically a µA710, which produces a pulse train, waveform 216, containing one pulse for each trigger output of discriminator 210.

The pulse train from discriminator 214 is applied to three logic units; lockout gate generator 218, delay gate generator 220 and "AND" gate 222. Lockout gate generator 218 and delay gate generator 220 are both monostable multivibrators, typically TTµL 9610. Lockout gate generator 218 serves two logic functions: first, the leading edge of the gate output is used to trigger the measurement gate generator 224 (another monostable multivibrator such as a TTµL 9601) and, second, the trailing edge of the inverted lockout gate is used to reset BCD decade counter 226, which typically is a SN7490, available from Texas Instruments.

The lockout gate from generator 218, as shown in waveform 228, is adjusted to be longer than the ringdown time of the acoustic signal so that only one measurement gate is generated for each acoustic event.

The measurement gate signal, from measurement gate generator 224, shown at 230, is "ANDED" with the pulse train output (wave 216) of discriminator 214 in "AND" gate 222, typically a MC846P available from Motorola Semiconductor Products. The pulses in the wave train output from "AND" gate 222, as shown at 232, are counted by BCD decade counter 226, whose output is converted to ten-line decimal by BCD-to-ten-line converter 234, which typically may be a SN7442 available from Texas Instruments.

The inverted output (shown at waveform 236) of delay gate generator 220 is applied to one input of "AND" gate 238 (typically a MC846P) whose other input is one or more lines of ten-line converter 234. The inverted delay gate input to "AND" gate 238 prevents an output from this circuit until after the rise time measurement cycle has been completed. If there is an output at the selected lines of ten-line converter 234 after the inverted delay gate time length has elapsed, an output from "AND" gate 24 will trigger count gate generator 240, another monostable multivibrator, such as a TTμL 9601. Outputs signals will pass through a line driver 242 of the sort discussed in conjunction with FIG. 3, above, and finally to an output terminal 244.

In order to cause an output count (wave 239) from the circuit shown in FIG. 5, the input signal must have a rise time equal to that time required for the acoustic signal to undergo the number of cycles specified by the selected number at the output of BCD to ten-line converter 234. For example, if five cycles is selected for a given measurement gate, output signals will be produced only for those acoustic signals which reach five successively higher amplitude peaks within the selected time. Acoustic events near a sensor will have the characteristics of rapid rise, while those further away will not. Rise time as defined in this circuit, then, is the number of progressively higher amplitude cycles that the acoustic signal undergoes before reaching its maximum amplitude.

Those skilled in the art will realize that the particular circuit components mentioned in the description of FIG. 5 are merely exemplary, and that other components and arrangement performing the indicated functions may be used. Also, various components such as potentiometers, resistors, capacitors, etc. may be included to add adjustability and refinements to the system.

Output logic pulses from either of the circuits shown in FIGS. 3 and 5 indicate that an acoustic signal has occured within a specific area of the structure being tested. The occurrence of these logic signals indicates the presence of a growing crack in the area and the number of such signals, as well as the number occurring per unit time, indicates the rate at which the crack is progressing. As mentioned above, these output signals can be handled in several ways, ranging from manual observation on an oscilloscope to computer processing of cumulative counted signals.

Other modifications, ramifications and applications of this invention will occur to those skilled in the art upon reading this disclosure. These are intended to be included within the scope of this invention, as defined in the appended claims.

We claim:

1. An apparatus for detecting progressive cracks in a structure which comprises:
   a sensor in contact with said structure, said sensor detecting acoustic pressure waves in said structure and producing corresponding electrical signals;
   discriminator means receiving said signals to eliminate signals which rise to a selected amplitude in greater than a selected time period; and
   output means for recording and examining signals which rise to said selected amplitude in less than said selected time period, whereby only those signals resulting from acoustic events in a region near said sensor reach said output means.

2. The apparatus according to claim 1 including a plurality of spaced sensors in contact with said structure and means to selectively connect any one of said sensors to said discriminator means.

3. The apparatus according to claim 1 further including a pulse generating means to introduce an acoustic pulse into said structure at a selected point.

4. The apparatus according to claim 1 wherein said discriminator means includes a pre-amplifier and band-pass filter means initially receiving said signals from said sensors.

5. The apparatus according to claim 1 wherein said means for recording and examining signals includes an oscilloscope means for directly observing signal wave form.

6. The apparatus of claim 1 which includes a load sensing means adapted to be operatively attached to the structure, said means for recording and examining signals including signal counting means and and X-Y plotter which is adapted to receive signals from the load sensing means and the signal counting means, the load sensing means responsive to varying loads on the structure and providing signals controlling one axis of the plotter and said signal counting means controlling the other axis of the plotter.

7. A method for detecting progressive cracks in a structure which comprisess the steps of
   sensing acoustic pressure waves at a point on said structure;
   producing electrical signals corresponding to said acoustic pressure waves;
   discriminating between signals which rise to a selected amplitude in more or less than a selected time period;
   eliminating those signals which take more than said selected time; and
   recording and examining those signals which take less than said selected time, whereby only signals which result from acoustic events occurring in a selected area around said point are recorded and examined.

8. The method according to claim 7 in which said signals are amplified and low frequency noise is filtered out before said signal selection.

9. The method according to claim 7 wherein signals are recorded and examined by plotting them on an X-Y plotter with counted signals controlling one axis and sensed structural load signals controlling the other axis.

10. An acoustic emission monitor comprising:
    an input means receiving signals from a sensor for detecting pressure waves and producing a corresponding electrical signal;
    a primary discriminator receiving said signal from said input means and producing a pulse each time said signal exceeds a first amplitude;
    a secondary discriminator receiving said signal from said input means and producing a pulse each time said signal exceeds a second amplitude higher than said first amplitude;
    a lockout gate generator producing a lockout gate signal in response to the first pulse from said primary discriminator;
    a primary gate generator connected to said lockout gate generator producing a primary gate signal of selected length in response to said first pulse from said primary discriminator;
    a secondary gate generator producing a secondary gate signal in response to the first pulse from said secondary discriminator; and
    logic means comparing said primary and secondary gate signals and producing an output signal when said signals coincide, whereby an output signal is produced only where the signal amplitude has increased from said first amplitude to said second amplitude within the time represented by said primary gate length, indicating that the sensed acoustic event occurred in a selected region around said sensor.

11. An acoustic emission monitor comprising:

an input means receiving signals from a sensor on a structure which detects acoustic pressure waves and produces a corresponding electrical signal;

an integrator circuit receiving said electrical signal from said input means and producing a stepped signal increasing in amplitude one step each time said electrical signal wave height exceeds the height of the previous wave;

a differentiator for receiving the stepped signal from said integrator and for producing a signal consisting of a trigger-like spike pulse for each step in said stepped signal;

a discriminator for receiving the signal from said differentiator and producing a pulse-train signal containing one pulse for each trigger spike output of said differentiator;

a lockout gate generator receiving said pulse-train signal and generating a lockout gate signal in response to the first impulse in said pulse-train;

a measurement gate generator receiving said lockout gate signal and generating a measurement gate of selected length in response to the leading edge of said lockout gate signal;

a delay gate generator also receiving said pulse-train signal and producing a delay gate signal slightly longer than said measurement gate and of opposite sign;

a first AND gate receiving said measurement gate signal and also receiving said pulse-train signal and producing a pulse corresponding to each pulse in said pulse-train which occurs within the measurement gate time period;

counter means receiving the signal from said first AND gate and producing a selected ten-like decimal signal;

a second AND gate receiving said delay gate signal and said selected ten-line decimal signal and producing an output signal if the selected ten-line decimal signal pulse number has occurred within the measurement gate period, whereby an output signal indicating a nearby acoustic event occurs only if the input signal has a rise time at least equal to that time required for the acoustic signal to undergo the number of cycles specified by the selected output of the counter means.

* * * * *